Figure 5:
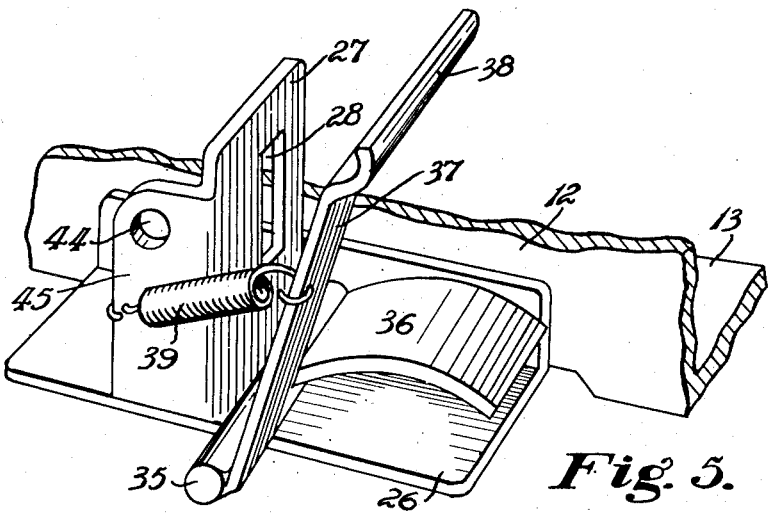

Dec. 25, 1951 — L. F. MORONEY — 2,579,597
SLIDABLE AND ADJUSTABLE SEAT
Original Filed Oct. 25, 1947 — 3 Sheets-Sheet 1
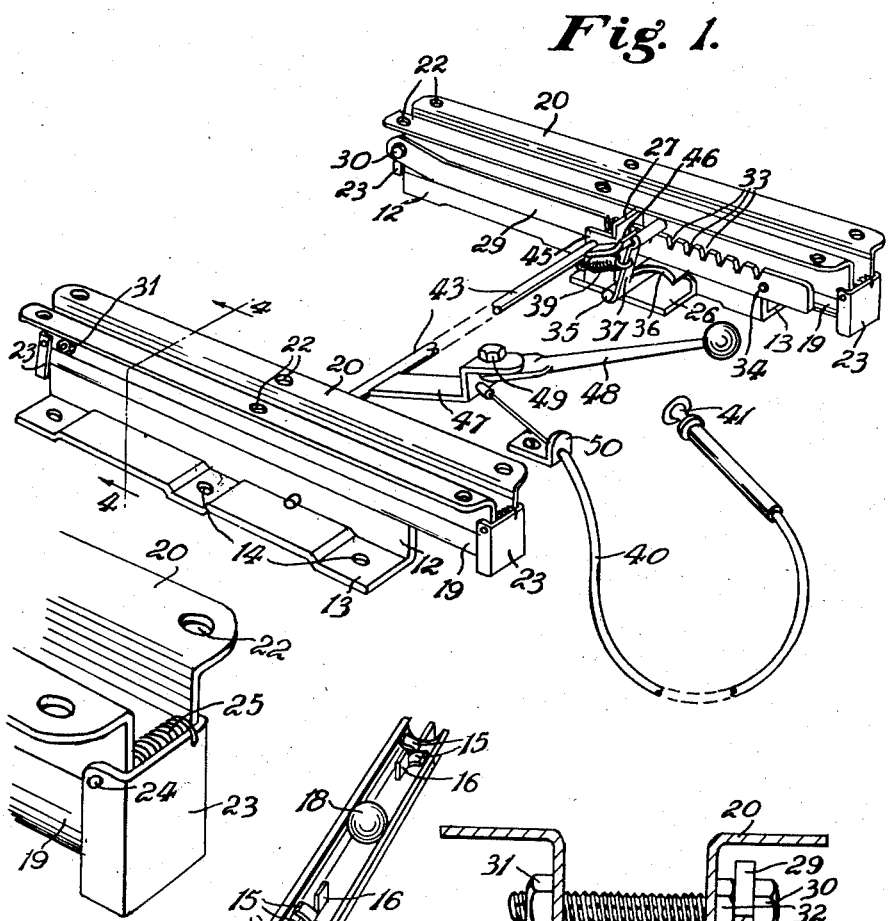
Fig. 1.
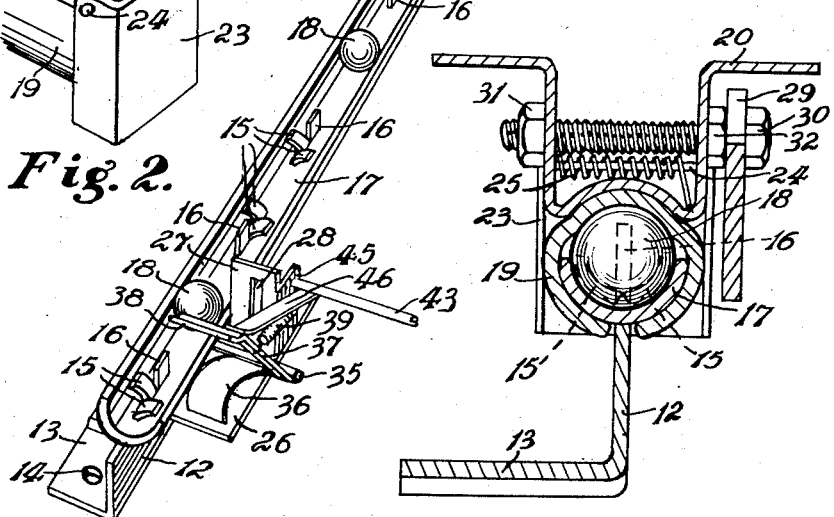
Fig. 2.
Fig. 3.
Fig. 4.
INVENTOR
LAURENCE FRANCIS MORONEY
BY
Oberlin & Limbach
ATTORNEYS.

Dec. 25, 1951  L. F. MORONEY  2,579,597
SLIDABLE AND ADJUSTABLE SEAT
Original Filed Oct. 25, 1947  3 Sheets-Sheet 2

INVENTOR
LAURENCE FRANCIS MORONEY
BY Oberlin & Limbach
ATTORNEYS.

Dec. 25, 1951   L. F. MORONEY   2,579,597
SLIDABLE AND ADJUSTABLE SEAT
Original Filed Oct. 25, 1947   3 Sheets-Sheet 3
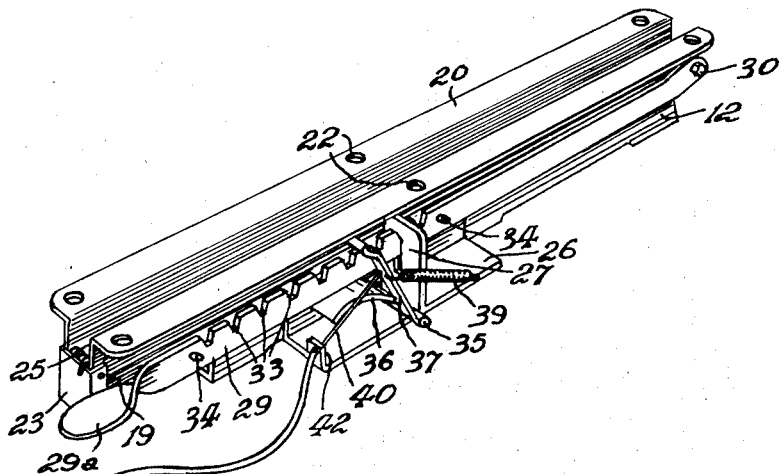
Fig. 8.
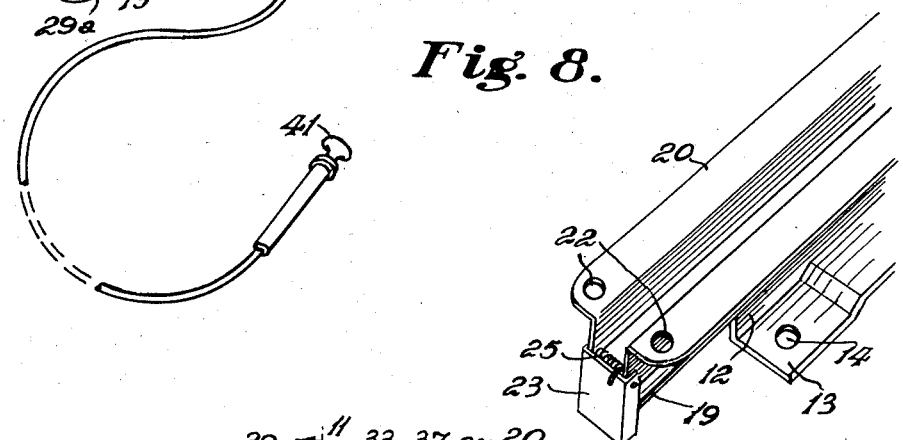
Fig. 9.
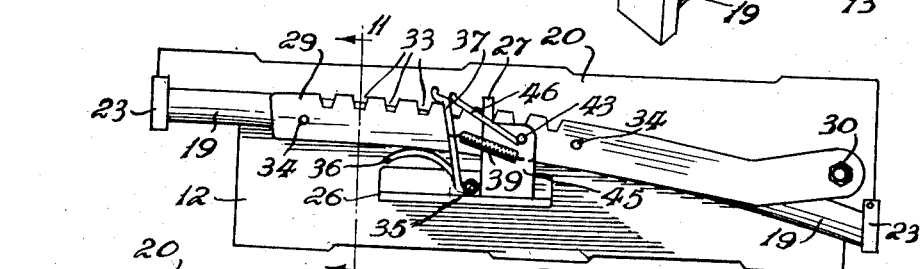
Fig. 10.
Fig. 11.
INVENTOR
LAURENCE FRANCIS MORONEY
BY
Oberlin & Limbach
ATTORNEYS.

Patented Dec. 25, 1951

2,579,597

UNITED STATES PATENT OFFICE 2,579,597

SLIDABLE AND ADJUSTABLE SEAT

Laurence Francis Moroney, Moonee Ponds, near Melbourne, Victoria, Australia

Continuation of application Serial No. 782,169, October 25, 1947. This application April 25, 1950, Serial No. 157,898. In Australia November 1, 1946

12 Claims. (Cl. 155—14)

This invention relates to improvements in or connected with slidable and adjustable seats, and it has more special reference to an improved mechanism whereby a seat may be readily moved back and forth or, if desired, simultaneously forwards and upwards, or rearwards and downwards, the mechanism including means of novel and improved character whereby it is adapted to be releasably locked in such desired adjusted position.

The invention is particularly well adapted for use in automobiles, but it may also be applied with advantage to the seats of aircraft, railway carriages and other vehicles and, in short, to other seats of such character that it is deemed to be desirable for such seats to be adjustable to suit individual requirements of persons of different heights or builds.

The principal object of my invention is to provide a seat which may be moved forwards or backwards, or alternatively forwards and upwards or backwards and downwards with a minimum of effort, and means whereby the seat may be very conveniently locked positively, but releasably, in desired adjusted position.

A further object of my invention is to provide a seat of the character set out wherein the adjustable sliding mechanism is of simple and economical yet durable character, adapted to be moved to desired adjustment with little frictional drag, and not being liable to bind or jamb as a consequence of strong pressure being applied to the seat back to force it back when the seat is in rearward position, or to force it forward when the seat is in advanced position.

With these and other objects in view, my invention resides broadly in a slidably adjustable control mechanism for a seat consisting of one or more mechanisms each including a lower assembly adapted to be secured to a stable foundation such as floorboards of an automobile and having a lower channel and bearing balls in the said channel; an upper assembly adapted to be secured to a seat, such as that of an automobile, and having an upper inverted channel, the lower portions of which are adapted to pass around and partially under the lower channel, the upper channel being adapted to bear upon the bearing balls and to be slidable along the lower channel; a tooth or notched rack associated with at least one upper assembly, the rear portion of the rack being pivotally connected to the rear portion of the said upper assembly; a stop member associated with the corresponding lower assembly, the said rack being freely movable longitudinally when in lowered position but adapted to engage with the said stop member to prevent such movement when in raised position; a bearer associated with the lower assembly and adapted to support the said rack and to carry it normally to raised position in engagement with the stop member; a release member associated with the said bearer and adapted, when the bearer is moved to permit the rack to be lowered to disengaged position, to co-act with the rack to force it out of engagement with the stop member; and means for moving the bearer and associated release member so as to throw the said rack out of engagement with the stop member.

The slidably adjustable seat control is further characterized in that the lower channel is mounted on a relatively thin longitudinal standard and is secured thereto by means of lugs on the standard passing through corresponding slots formed in the channel, the said lugs being secured in the said slots, and acting further to limit runways in the lower channel for the bearing balls.

Other features of the invention will be apparent from the following description, with reference to the drawings, which illustrate practical methods of carrying my invention into effect.

Figure 6:
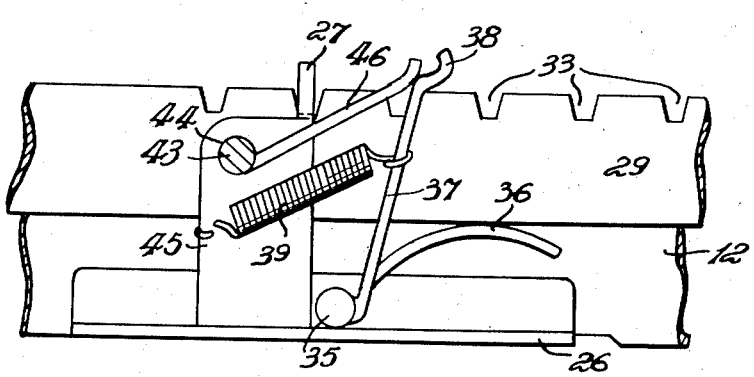
Figure 7:
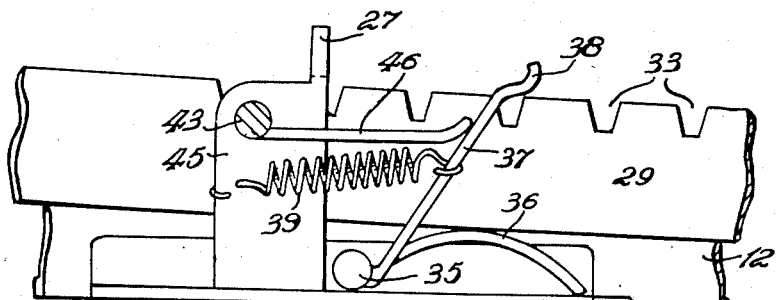

In order that my invention may be more readily understood, reference is now made to the said drawings, wherein:

Fig. 1 is a perspective view of an interconnected pair of adjustable sliding seat control mechanisms, each of said mechanisms being provided with individual locking means, Fig. 2 is an enlarged perspective detail drawing of an end portion of one of the mechanisms showing particularly a grease-trap device thereof, Fig. 3 shows in perspective the lower assembly of one of the sliding seat control mechanisms, Fig. 4 is a cross-sectional view, to enlarged scale, along line 4—4 in Fig. 1, Fig. 5 is a perspective partly broken-away illustration of portion of a locking device of one of the control mechanisms, Fig. 6 illustrates in side elevation a locking device in locked or engaged position, Fig. 7 shows the locking device in unlocked or disengaged position, Fig. 8 illustrates in perspective a pair of sliding seat control mechanisms, only one of the mechanisms having a locking device, Fig. 9 shows in side elevation the application of the invention to a sliding seat mechanism having runways curved arcuately in a vertical plane, Fig. 10 is a plan view of the lower assembly of the mechanism shown in Fig. 9, and Fig. 11 is an enlarged cross-sectional view along line 11—11 in Fig. 9.

The sliding seat control mechanisms illustrated in the drawings are devised particularly for use with an automobile seat of generally conventional type. Each of the mechanisms includes an upper and a lower assembly.

The lower assembly of each mechanism includes a standard 12, which consists of a length of metal of substantially L-shaped cross-section, the lower portion thereof forming a base 13, in which are formed holes 14 whereby the lower assembly may be firmly bolted or screwed to the floorboards of an automobile. The standard illustrated in Figs. 9, 10 and 11 has its upper edge curved arcuately, for a purpose which will be hereinafter described; but in the other illustrated forms of my invention, the upper edge of the standard is substantially parallel to the base. The standard 12 is provided with four sets of integral adjacent upstanding lugs designated 15 and 16. A channel-piece 17, consisting of a length of metal of substantially semi-circular cross-section is secured on the standard 12. The channel-piece depicted in Figs. 9 to 11 is curved arcuately to conform to the curvature of the upper portion of the standard shown in those drawings; the channel piece shown in the other drawings is straight. The channel-piece has four longitudinal slotted holes formed along its centre-line and adapted to receive closely the four sets of upstanding lugs 15, 16. Particular reference is now made to Fig. 3, wherein are shown three lugs in each set. The two outermost lugs 15 of each of the outermost sets are bent over in opposite directions, and the two innermost lugs 15 of each of the innermost sets are likewise bent over, thus acting to hold the channel-piece 17 firmly and rigidly in place on the standard 12. The other lugs 16 are left upstanding to form stops defining the limits of two runways. In Fig. 10 to which reference is now made, the channel piece 17 illustrated therein is divided into three runways. The outermost sets of lugs 15, 16 are similar to those shown in Fig. 3, but the innermost sets each consists of four adjacent lugs, and in each of the innermost sets the first and fourth lugs designated 16, are left upstanding to form stops, while the second and third lugs 15 are bent over oppositely to hold the channel-piece 17 firmly and rigidly in place.

Into each of the runways there is introduced a bearing ball 18 of such diameter that it will fit closely within the channel-piece 17, but will run easily therein.

The upper assembly of each seat control mechanism consists essentially of an upper inverted channel-piece 19 and a seat bearer 20 welded or otherwise secured thereto. The upper channel-piece 19 shown in Figs. 9 to 11 is curved arcuately from end to end to conform to the curvature of the lower channel-piece 17 depicted in those drawings; and in the other illustrations, the upper channel-piece is straight. The upper channel-piece 19 is of somewhat greater length than the lower channel-piece 17. The top portion of the upper channel-piece is curved arcuately, in cross-section, to about the same radial length as that of the lower channel-piece 17, and is adapted to bear upon the bearing balls 18. Therebelow, on either side, the upper inverted channel-piece 19 is shaped to fit closely about the lower channel-piece, its lower edges closely approaching the standard 12 on either side. The upper channel-piece 19 is adapted to slide freely longitudinally over the lower channel-piece 17, running smoothly and with little friction, on the bearing balls 18. The upper channel-piece cannot, however, be lifted off the lower channel-piece, nor can it be rotated laterally more than a very slight amount. The relatively thin construction of the standard 12 which is possible because of the method of fixture of the lower channel-piece thereto, enables the upper channel piece 19 to be curved around and under the lower channel-piece on both sides to the practical maximum extent. In consequence, the upper channel-piece will not bind or jamb on the lower channel-piece.

The seat bearers 20 shown in Figs. 1, 2, 4 and 8 each consist of a length of inverted "top-hat-section" metal welded to the upper channel-piece 19. The seat bearer 20 shown in Figs. 9 and 11 is of substantially inverted L-shape, in cross-section, its lower edge portion being curved arcuately to conform to the curvature of the upper channel-piece, and being bent over, as indicated, at 21, to facilitate its being welded to the said upper channel-piece.

The seat bearers 20 have appropriately formed apertures 22 formed therein whereby they may be bolted or screwed to the underside of the automobile seat.

In order to facilitate the movement of the upper channel piece over the lower channel-piece, so that the seat may be moved freely in relation to the floor of the vehicle, the runways in the lower channel-piece are preferably packed with a suitable lubricating grease, which acts further to retain the bearing balls 18 in the position to which they have been brought by the movement of the upper channel-piece despite vibration or jolting which might otherwise cause them to move towards one end of their runways. In order to prevent any exuded grease from soiling the clothing of a person sitting in the vehicle, there is provided at each end of each upper assembly a grease-trap 23, consisting of a metal flap, the bent-over sides of which are rotatably connected by means of an axis pin 24 to the seat bearer 20 so that the lower portion of the grease-trap covers the end of the upper channel-piece 19. Each grease-trap 23 is normally held in such position by means of a torsion spring 25 wound about the axis pin 24, one end of the spring engaging the seat-bearer and the other end engaging the top of the grease-trap.

Means are provided whereby the slidably adjustable seat may be held in desired position. In the case of a small vehicle wherein the seat is of relatively small width, it is necessary to provide a locking device on one sliding mechanism only, and such an arrangement is shown in Fig. 8. For wider seats, it is desirable to provide a locking device on two mechanisms, the locking devices being interconnected, this arrangement being illustrated in the other drawings.

Each locking device includes a laterally-extending metal supporting bracket 26 welded or otherwise secured to the inner side of the standard 12 of the lower assembly. Secured to the said supporting bracket is an up-standing slotted bracket 27 having a substantially vertical slotted hole 28 formed therein from front to rear. A rack 29, associated with the upper assembly, is passed through the slot 28. The rack consists of a metal strip of substantially rectangular cross-section bent upwardly near to its rear end, the said rear end being pivoted by means of a bolt 30 and nut 31 to the seat bearer 20, and spaced therefrom as by a nut 32 on the bolt 30. A number of notches 33 are formed in the upper surface of the rack 29 at suitable spaced intervals. The rack 29 is adapted to slide freely through the slot 28 in the slotted bracket 27 when the upper assembly is moved longitudinally in relation to the lower assembly; but when the rack is raised pivotally, a notch 33 is adapted to engage with the upper portion of the slotted bracket 27 above the slot 28 to prevent such slidable movement. Stops 34, each of which may consist of a rivet, are provided on the rack to limit its slidable movement through the slotted bracket 27 in either direction beyond the notched portion of the rack.

Means are provided to hold the rack 29 normally in raised or engaged position, and associated means are provided whereby the rack may be forced downwards to disengaged position. Such means include a lateral shaft 35 rotatably mounted in the lower assembly and extending inwardly above the supporting bracket 26 and in front of the slotted bracket 27. Welded to the shaft 35 is a bearer plate 36 and an associated bridge member 37. The bearer plate and bridge member are formed from a single substantially rectangular piece of sheet metal, an inverted L-shaped cut being formed therein, extending from an upper side portion thereof. The sheet metal member is welded along its lower edge to the shaft 35, and the bearer plate is bent forwardly in an arcuate curve. The remaining bridge member, of inverted L-shape, has its upper or substantially horizontal arm 38 curved, in side elevation, as shown in the drawings. A helical tension spring 39 is connected at one end to the upright arm of the bridge member, and is carried rearwards and has its other end anchored to the slotted bracket 27 or to the supporting bracket 26. The said spring normally holds the bearer plate 36 in raised position, bearing on and supporting the rack 29 in raised or engaged position. Means are provided whereby the upper arm 38 of the bridge member 37 may be carried forwards and downwards so as to bear upon the upper surface of the rack 29 against the action of the spring 39 whilst, simultaneously, the bearer plate 36 is lowered. The rack 29 is thus carried downwards to disengaged position. Such means include a flexible control cable 40 of well-known type, terminating at one end in a pull-knob 41 which is arranged in a convenient position, preferably in the dashboard of the vehicle.

In the single locking device arrangement shown in Fig. 8, the other end of the control cable 40 passes through a bracket 42 on the front of the supporting bracket 26 and is carried rearwardly therefrom and is connected to the upright arm of the bridge member 37 so that, when the pull-knob 41 is pulled by hand, the cable 40 causes the bridge member 37 to be pulled forwards and downwards to release the rack 29 from engagement with the slotted bracket 27. In case the cable 40 should break or otherwise become inoperative, the front portion of the rack 29 illustrated in Fig. 8 is bent over, as shown at 29a, to form a handle located preferably beneath the front of the seat. The handle 29a may be depressed by hand to throw the rack 29 out of engagement with the slotted bracket 27.

In the other drawings, wherein a double locking device arrangement is illustrated, a cross-bar 43 connects the locking devices of the two slidable seat control mechanisms. The said cross-bar is rotatably mounted at its end in apertures 44 formed in side plates 45, each of which is formed integrally with a slotted bracket 27, extending rearwardly from the said slotted bracket. The cross-bar 43 may be curved upwardly where required to pass over the automobile transmission or any other projecting portion of the floor. Near to each end of the cross-bar there is welded a radially extending actuating member 46, the front portion of which is curved upwardly and is adapted to bear against the rear face of the upright arm of the bridge member 37. There is also welded to the cross-bar a handle arm 47 to which a handle 48 is pivotally connected by means of a bolt 49. The said handle is normally folded inwardly under the vehicle seat. The control cable 40 in this case is carried through a bracket 50 secured to the floor-boards of the vehicle and thence rearwardly and upwardly to the handle arm 47, to which it is secured.

When the pull-knob 41 is pulled, the handle arm is pulled downwards, rotating the cross-bar 43 and moving the actuating members 46 downwards. The actuating members, bearing upon the spring-loaded bridge members 37, force the said bridge members forwardly and downwardly, throwing the racks 29 out of engagement with the respective slotted brackets 27 (see Fig. 7), whereupon the seat may be moved forwardly or backwardly as desired. To lock the seat in desired adjusted position, the pull-knob 41 is released. The springs 39 pull the bridge members 37 rearwards and upwards, and at the same time the associated bearer plates 36 are brought upwards, raising the racks 29. If a notch 33 of each rack does not immediately engage with the slotted bracket 27, a slight forward or backward movement of the seat will cause such engagement to occur. If the seat should be slightly skewed, the fact that one rack 29 is not able to engage immediately with its slotted bracket 27 will not prevent the other rack from so engaging, if a notch 33 thereof is in suitable position. The seat will then be locked, and the disengaged rack will fall into the engagement when the seat moves to correctly aligned position.

The sliding seat control mechanism shown in Figs. 9 to 11, have arcuately curved co-acting lower and upper channel-pieces, the chord of the arc being inclined upwardly from rear to front, is adapted to permit the seat to be moved forwardly and upwardly, or rearwardly and downwardly. At the same time as the seat is brought to advanced position, the back of the seat is carried to more or less upright position, and the seat to more or less horizontal position. On the other hand, when the seat is moved rearwardly and downwardly, the seat back is inclined at the same time, and the seat is tilted. This form of adjustment is preferred by some manufacturers, and my present invention is equally applicable thereto, as has been hereinbefore described. In this form of mechanism, however, it is deemed to be desirable to include three runways and three bearing balls, whereas the straight mechanism operates very satisfactorily with two runways and two bearing balls. A seat mounted on sliding seat control mechanism of the type shown in Figs. 9 to 11 should preferably be counterbalanced by one or more helical tension springs each secured at one end to the rear portion of the underside of the seat and carried forwards to an anchorage on the floor-boards of the vehicle, or, alternatively, each connected at its rear end to the rear portion of the upper assembly of one of the sliding seat mechanisms and at its other end to the front portion of the corresponding lower assembly. The action of such spring or springs is to tend to carry the seat forwards and upwards. The seat may, however, easily be forced backwards and downwards by movement of the legs of the person seated therein.

In order that the bearing balls cannot be carried out of position by vibration, particularly in the form of the invention shown in Figs. 9 to 11, fixed pins or stops 50 (see Fig. 11) which extended downwardly from the top of the upper channel-piece 19. The pins are so arranged that when the seat is in forward position, one pin is carried to a position directly in rear of each bearing ball; and when the seat is in rearmost position, directly in front of each bearing ball.

My invention will be found to be very effective in achieving the objects for which it has been devised.

What I do claim is:

1. A slidably adjutable control mechanism for a seat consisting of at least one mechanism including a lower assembly adapted to be secured to a stable foundation such as floorboards of an automobile and having a lower channel and bearing balls in the said channel; an upper assembly adapted to be secured to a seat such as that of an automobile and having an upper inverted channel the lower portions of which are adapted to pass around and partially under the lower channel, the upper channel being adapted to bear upon the bearing balls and to be slidable along the lower channel; a notched rack associated with the upper assembly, the rack being pivotally connected to the said upper assembly; a stop member associated with the corresponding lower assembly; the said rack being freely movable longitudinally when in lowered position but adapted to engage with the said stop member to prevent such movement when in raised position; a bearer associated with the lower assembly and adapted to support the said rack and to carry it normally to raised position in engagement with the stop member; a release member associated with the said bearer and adapted, when the bearer is moved so as to permit the rack to be lowered to disengaged position, to coact with the rack to force it out of engagement with the stop member; and a hand-operable mechanism adapted to move the bearer and associated release member so as to throw the said rack out of engagement with the said stop member.

2. A slidably adjustable control mechanism for a seat according to claim 1 wherein the lower assembly comprises a relatively thin longitudinal standard adapted to be secured to a base; upwardly extending lugs on the standard; a channel; slots in the lower portion of the channel; the said lugs being secured in the said slots to maintain the channel on the standard.

3. A slidably adjustable control mechanism for a seat according to claim 2 wherein the lugs are bent over within the channel to secure the said channel on to the standard.

4. A slidably adjustable control mechanism for a seat according to claim 2 wherein lugs extend upwardly into the channel to define the limits of runways in the channel for the bearing balls positioned therein.

5. A slidably adjustable control mechanism for a seat according to claim 2 wherein the inverted upper channel of the upper assembly is curved along the upper portion to conform to the circumferential curve of the bearing balls upon which it bears; its lower portion being curved to conform to the external shape of the portions of the lower channel with which it engages; and its lower edge portions being closely adjacent the standard upon which the lower channel is mounted.

6. A slidably adjustable control mechanism for a seat according to claim 1 wherein a spring-loaded hinged flap is mounted at each end of the upper inverted channel.

7. A slidably adjustable control mechanism for a seat according to claim 1 wherein the bearer comprises a spring-loaded arcuately curved member hingedly connected to the lower assembly and adapted to bear on the underside of the rack to maintain the said rack normally in raised position.

8. A slidably adjustable control mechanism for a seat according to claim 7 wherein the release member is rigidly secured to the spring-loaded bearer and comprises a member of substantially inverted L-shape, the upper arm of which is adapted to bear upon the upper portion of the rack when the bearer is hingedly lowered, in such manner as to depress the said rack.

9. A slidably adjustable control mechanism for a seat according to claim 1 wherein the hand-operable mechanism which is adapted to move the bearer and associated release member so as to throw the rack to disengaged position includes a lever mechanism adapted to force the bearer and associated release member to lowered position, and a flexible control cable connected at one end to a pull-knob and at the other end connected to the said lever mechanism.

10. In a slidably adjustable control mechanism for a seat of the type wherein an upper assembly associated with the seat is adapted to be moved longitudinally in slidable engagement with a lower assembly secured to a base, a releasable locking mechanism comprising a notched rack pivotally connected at one end to a corresponding end of the upper assembly; a stop member associated with the lower assembly; the said rack being freely movable longitudinally when in lowered position, but adapted to engage with the said stop member to prevent such movement when in raised position; a bearer associated with the lower assembly and adapted to support the said rack and carry it normally to raised position in engagement with the stop member; a release member associated with the bearer and adapted, when the bearer is moved to permit the rack to be lowered to disengaged position, to co-act with the rack to force it out of engagement with the stop member; and means for moving the bearer and associated release member so as to throw the said rack out of engagement with the said stop member.

11. In a slidably adjustable control mechanism for a seat of the character wherein a lower channel is mounted on a standard adapted to be secured to a base, bearing balls being positioned within the lower channel, and an inverted upper channel is connected to a seat and is longitudinally slidable along the lower channel, the upper channel bearing on the bearing balls in the lower channel, its lower portions passing around and partly under the lower channel; the provision of upwardly extending lugs on the standard; and correspondingly located slots in the lower channel; the said lugs being secured in the said slots to fasten the lower channel on the said standard and so as to define runways in the said lower channel for the bearing balls which are positioned therein.

12. In a slidably adjustable control mechanism for a seat of the character having an upper channel for attachment to the seat and a co-acting lower channel for attachment to a lower support, locking means for holding the seat in adjusted position including a notched lever pivoted on the upper channel, combined guide and hold means for said lever including a fixed member alongside the lower channel and having an opening in which said lever rides for axial movement and latching and unlatching therein by its notches, a spring-loaded lever member bearing against the underside of the rack maintaining it normally raised, and a manual control for said member.

LAURENCE FRANCIS MORONEY.

REFERENCES CITED

The following references are of record in the file of this patent:

UNITED STATES PATENTS

| Number | Name | Date |
|---|---|---|
| 1,979,860 | Browne | Nov. 6, 1934 |
| 2,095,442 | Jacobs | Oct. 12, 1937 |
| 2,100,546 | Kramer | Nov. 30, 1937 |